United States Patent
Beardsley et al.

(10) Patent No.: US 6,748,557 B1
(45) Date of Patent: *Jun. 8, 2004

(54) SYSTEM, METHOD, AND PROGRAM FOR DETERMINING THE AVAILABILITY OF INTERFACES TO A CONTROL UNIT

(75) Inventors: Brent Cameron Beardsley, Tucson, AZ (US); William J. Rooney, Hopewell Junction, NY (US); Harry Morris Yudenfriend, Poughkeepsie, NY (US)

(73) Assignee: International Buisness Machines Corporation, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 09/671,216

(22) Filed: Sep. 27, 2000

(51) Int. Cl.[7] ............................................. G06F 11/00
(52) U.S. Cl. .............................. 714/43; 714/4; 709/239
(58) Field of Search .................. 714/9, 43, 44, 714/4, 5, 7; 709/239; 710/38; 310/217; 370/225, 217; 340/2.23

(56) References Cited

U.S. PATENT DOCUMENTS

| | | | |
|---|---|---|---|
| 4,075,693 A | 2/1978 | Fox et al. | |
| 5,099,485 A | 3/1992 | Bruckert et al. | |
| 5,119,488 A | 6/1992 | Takamatsu et al. | |
| 5,218,601 A * | 6/1993 | Chujo et al. | 370/228 |
| 5,361,249 A | 11/1994 | Monastra et al. | |
| 5,574,950 A | 11/1996 | Hathorn et al. | |
| 5,633,999 A | 5/1997 | Clowes et al. | |
| 5,671,441 A * | 9/1997 | Glassen et al. | 710/8 |
| 5,701,429 A | 12/1997 | Legvold et al. | |
| 5,724,341 A | 3/1998 | Inoue | |
| 5,724,501 A | 3/1998 | Dewey et al. | |
| 5,790,775 A | 8/1998 | Marks et al. | |
| 5,812,556 A | 9/1998 | Schmidt | |
| 5,864,662 A * | 1/1999 | Brownmiller et al. | 714/43 |
| 5,870,537 A | 2/1999 | Kern et al. | |
| 5,872,911 A * | 2/1999 | Berg | 714/43 |
| 5,933,422 A * | 8/1999 | Kusano et al. | 370/331 |
| 5,941,992 A * | 8/1999 | Croslin et al. | 714/4 |
| 6,047,331 A * | 4/2000 | Medard et al. | 709/239 |
| 6,052,796 A * | 4/2000 | Croslin | 714/4 |
| 6,075,766 A * | 6/2000 | Croslin | 370/225 |
| 6,078,946 A * | 6/2000 | Johnson | 709/200 |
| 6,134,671 A * | 10/2000 | Commerford et al. | 714/4 |
| 6,141,318 A * | 10/2000 | Miyao | 370/217 |
| 6,205,117 B1 * | 3/2001 | Doshi et al. | 370/228 |
| 6,337,846 B1 * | 1/2002 | Bengston et al. | 370/216 |
| 6,629,148 B1 * | 9/2003 | Ahmed et al. | 709/238 |
| 6,643,254 B1 * | 11/2003 | Kajitani et al. | 370/217 |
| 2001/0032271 A1 * | 10/2001 | Allen | 709/239 |

OTHER PUBLICATIONS

"Graceful Degradation in a Multiple Data Path Environment" IBM Technical Disclosure Bulletin, vol. 16, No. 3, Aug. 1973, pp. 912–914.

* cited by examiner

Primary Examiner—Robert Beausoliel
Assistant Examiner—Gabriel Chu
(74) Attorney, Agent, or Firm—Konrad Raynes & Victor LLP; David W. Victor

(57) ABSTRACT

Disclosed is a system, method, and program for analyzing proposed interface ports to a device. For each proposed interface port, a determination is made of a number of single points of failure for the proposed interface port in common with interface ports currently used to access the device. For each proposed interface port, a determination is made of a relative availability rating based on the number of single points of failure for each proposed interface port.

30 Claims, 5 Drawing Sheets

| Manufacturer | Device Type | Model No. | Cluster Mask | I/O Bay Mask | Interface Mask |
|---|---|---|---|---|---|
| IBM | 3990 | 006 | 00F0 | 00FC | 0000 |
| IBM | 3990 | G03 | 00F0 | 00FC | 0000 |
| IBM | 3990 | | 00F0 | 00FC | 0000 |
| IBM | 2105 | | 0080 | 00E0 | 00FC |
| IBM | | 03 | 0080 | 00E0 | 00FC |
| ABC | 3990 | | 00F0 | 00FC | 0000 |
| | | | 00F0 | 00FC | 0000 |

FIG. 3

SYSTEM, METHOD, AND PROGRAM FOR DETERMINING THE AVAILABILITY OF INTERFACES TO A CONTROL UNIT

RELATED APPLICATIONS

This patent application is related to the co-pending and commonly assigned patent applications filed on the same date herewith and which applications are incorporated herein by reference in their entirety:

"System, Method, And Program For Determnining the Availability of Paths to a Device", to William J. Rooney and M. Yudenfriend, and application Ser. No. 09/670.736; and "System, Method, And Program For Determining The Availability of Interfaces to a Device from Information Provided by the Device", to Brent C. Beardsley, William J. Rooney, and M. Yudenfriend, and application Ser. No. 09/671,416.

BACKGROUND OF THE INVENTION

1. Field of the Invention

The present invention relates to a system, method, and program for analyzing proposed interface ports to a device and, in particular, to a storage controller that controls access to an Input/Output (I/O) device.

2. Description of the Related Art

Host computer systems may perform input/output (I/O) operations against a storage unit, such as a Direct Access Storage Device (DASD), which is comprised of numerous interconnected hard disk drives (HDDs) that form a single mass storage space. In such systems, a storage controller, also referred to as a control unit, manages input/output (I/O) operations between the host systems and the DASD. Examples of control units include the International Business Machines ("IBM") Enterprise Storage Server, described in the publication "IBM Enterprise Storage Server: Introduction and Planning Guide", IBM document no. GC26-7294-02 (IBM Copyright, November 1999) and the IBM 3990 Storage Controller, described in IBM publication, "IBM 3990 Storage Control Reference (Models 1, 2, and 3), IBM document no. GA32-0099-06 (Copyright IBM Corp. 1988, 1994), which publications are incorporated herein by reference in its entirety.

The hosts include a channel subsystem that directs the flow of data between the host main storage and the storage controllers. In current implementations, each host may have up to 256 channels. Each channel is identified by a channel path identifier (CHPID). A channel comprises a host adaptor into which a cable is connected that leads directly to an interface port on the storage controller or a port in a switch that links to the storage controller. A channel path comprises the physical connection from a host adaptor to a port on a switch, such as an ESCON director, and the connection from another port on the same switch to an interface port in the control unit. In current implementations, a channel path in the host may be dynamically assigned to one physical path comprising the connection links from the host adaptor to the switch port, and then from another port on the same switch to the interface port in the control unit. The commonly assigned and co-pending U.S. patent application No. 09/407,544, entitled "Method, System, and Program Products for Managing I/O Configurations of a Computing Environment" filed on Sep. 28, 1999 by P. B. Yocom, H. M. Yudenfriend, W. J. Rooney, Richard Cwiakala, which patent is incorporated herein by reference in its entirety, describes an architecture for allowing the dynamic assignment of channel paths in the host to different physical paths from the host to the control unit.

The above patent mentions that one goal of dynamically assigning host channel paths to a physical path is to find the path assignment for a channel path that provides the best availability, i.e., avoids any single point of failures. For this reason, there is a need in the art to determine the availability of the storage controller resources to use in determining the most highly available interface to the storage controller.

SUMMARY OF THE PREFERRED EMBODIMENTS

To determine the availability of storage controller resources, preferred embodiments disclose a system, method, and program for analyzing proposed interface ports to a device. For each proposed interface port, a determination is made of a number of single points of failure for the proposed interface port in common with interface ports currently used to access the device. For each proposed interface port, a determination is made of a relative availability rating based on the number of single points of failure for each proposed interface port.

In further embodiments, determining the number of single points of failure further comprises reading failure boundary data from the device indicating at least one failure boundary of a proposed interface to the device. Further, determining the relative availability rating based on the single points of failure comprises comparing the failure boundary of the proposed interface with failure boundary data indicating at least one failure boundary of existing interfaces to the device.

In still further embodiments, at least one mask is applied to the failure boundary data for the proposed interface and existing interfaces to determine at least one failure boundary for the proposed interface and existing interfaces. The determined at least one failure boundary for the proposed and existing interfaces is compared to determine the availability rating.

In yet further embodiments, there are a plurality of failure boundaries in the device. A failure of a higher order failure boundary for one interface would cause the failure of all lower order failure boundaries for the interface and wherein the failure of a lower order failure boundary for one interface would not cause the failure of all higher order failure boundaries in the interface. In such case, determining the availability rating comprises increasing the availability rating for each failure boundary whenever the failure boundary value for the proposed interface and one existing interface match. A higher relative availability rating indicates that the proposed interface has more single points of failure than other proposed interfaces.

Preferred embodiments provide a technique for determining the relative availability of proposed interfaces to a device, such as a control unit, using data made available from the device indicating failure boundaries of the proposed interface. The failure boundaries would comprise specified points of failure and repair in the control unit that may or may not affect the operation of other components. For instance, in control unit implementations, the failure and repair boundaries may comprise a power cluster, an I/O bay within the cluster, and an interface card within the I/O bay. For instance, a cluster can be taken off-line for repair or as a result of a failure without affecting the I/O bays and interface cards in other clusters and an I/O bay can be taken off-line without affecting interface cards in other I/O bays.

Preferred embodiments determine the availability for different interfaces to the control unit by considering whether the failure and repair boundaries of the proposed interface match the failure and repair boundaries of existing interfaces to the control units that are already used by a channel path in the host.

Control unit implementations provide descriptive data that can be used by a host to determine service and power boundaries for the different proposed interfaces to the device that can be used when determining which interface to the device to select for the next channel to add to a host. This consideration of the availability index of the interface may or may not be considered with the availability for upstream components, such as any switches and host adaptors in determining which path to select for the host.

BRIEF DESCRIPTION OF THE DRAWINGS

Referring now to the drawings in which like reference numbers represent corresponding parts throughout:

FIG. 3 illustrates logic to determine a table of masks to apply to the node descriptor data in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
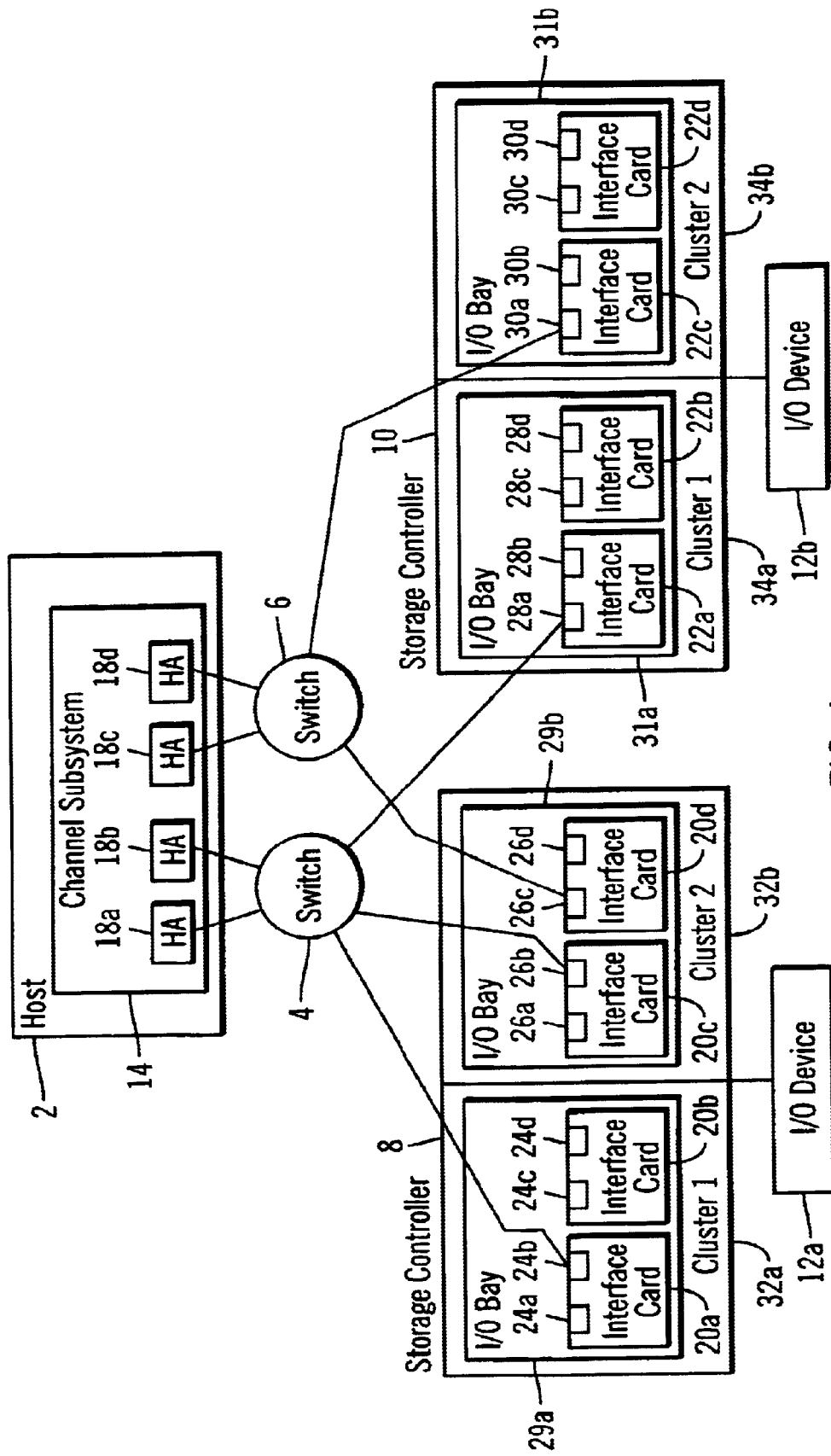
FIG. 1 is a block diagram illustrating a computing environment in which preferred embodiments are implemented.

FIG. 1 illustrates an arrangement of a host 2, switches 4 and 6, and storage controllers 8 and 10. The storage controllers 8 and 10 provide access to an I/O device 12a, b, which may comprise any storage device known in the art, such as interlinked hard disk drives, tape storage, etc. In preferred embodiments, the host 2 includes a channel subsystem 14 which manages I/O operations for the host. The channel subsystem 14 provides channels 18a, b, c, d along which a host I/O is communicated and managed to the I/O device 12. A channel 18a, b, c, d is comprised of a host adaptor (HA) that provides a physical connection from the host 2 to the switches 4, 6. The channel subsystem 14 may use dynamic channel path management, such as the dynamic channel path management technique described in the co-pending patent application entitled "Method, System, and Program Products for Managing I/O Configurations of a Computing Environment", having U.S. patent application No. 09/407,544, incorporated by reference above, to assign channels 18a, b, c, d to a physical connection to one of the storage controllers 8 or 10. A physical connection is defined as the physical connection from a channel 18a, b, c, d to a port on one switch 4 and 6, and from another port on the same switch 4 or 6 to a port on one interface card in the storage controllers. The switches 4 and 6 may comprise ESCON directors having numerous ports, or any other type of switching device known in the art. Further details of the components in the host 2 are described in the commonly assigned and co-pending patent application Ser. No. 09/670,736 entitled "System, Method, And Program For Determining the Availability of Paths to a Device", which application was incorporated herein by reference above.

The storage controllers 8 and 10 also include Input/Output bays 29a, b and 31a, b, respectively, into which the interface cards 20a–d and 22a–d, respectively, are attached. The interface cards 20a, b, c, d and 22a, b, c, d include ports 24a, b, c, d, 26a, b, c, d, 28a, b, c, d, and 30a, b, c, d into which the cable from the switch 4, 6 port connects. The I/O bays 29a, b and 31a, b, comprise cages that plug into the clusters 32a, b or 34a, b, and provide the interface electronics for the interface cards 20a–d and 22a–d. Each I/O bay 29a, b and 31a, b, may be serviced separately, such that one I/O bay can be taken off-line and serviced without affecting the operations of the interface cards in another I/O bay.

Each storage controller 8 or 10 includes clusters 32a, b and 34a, b, respectively, which comprise a separate power boundary such that a power failure on one cluster will not affect the components of the other cluster which can remain active and on-line.

The arrangement of FIG. 1 is an example of a topology and is not intended to limit the invention. In alternative embodiments, there may be multiple hosts, a particular host may include more host adaptors (HA) than shown; a switch may have multiple ports for connecting with the hosts and control units; each storage controller 8 and 10 may include more than two clusters; each cluster may include more than two I/O bays; each I/O bay may include more than two interface cards; and each interface card may have one or more ports to connect to switch 4, 6 ports. Still further, there may be no switches, thereby providing a direct connection from a host adaptor to an interface port.

When defining a channel 18a, b, c, d from the host 2 to a switch 4, 6, it is desirable to select a channel path that improves the availability of the overall system by avoiding a single point of failure. Preferably, the host would want to provide at least two channel paths to each storage controller 8 and 10 to avoid a single point of failure to the storage controller. To accomplish this goal, the host 2 would want to analyze each point in the connections from the host adaptor 18a, b, c, d, to the ports in the switches 4 and 6 to interface ports 24a, b, c, d; 26a, b, c, d; 28a, b, c, d; 30a, b, c, d to select a path through such components that avoids a single point of failure with paths currently used, such that if any point in the current physical paths assigned to channels failed, such failure would not affect the alternative redundant physical path to which the new channel path will be assigned. Preferred embodiments are concerned with determining the availability index of selecting an interface port at the control unit. This availability index of a proposed interface to the control unit may then be considered with availability indexes at different levels, such as the switch level and host adaptor level, using different availability calculation techniques. The commonly assigned and co-pending patent application Ser. No. 09/670,736 entitled "System, Method, And Program For Determining the Availability of Paths to a Device", incorporated by reference above, describes details on determining the availability of components within the host and switch and determining an overall availability of the entire channel path, including host adaptor, switch, and interface card to control unit.

For instance, if the host 2 already had a connection to switch 4, but not switch 6, then the host would want to assign the next channel path to a physical path that includes switch 6 to avoid the current single point of failure at switch 4. Still further, if the host 2 already had a channel path using one cluster 32a on storage controller 8, then the host would want a new channel 18a, b, c, d to use the other cluster 32b, thereby allowing the connection to survive the failure of one cluster power boundary. Still further, if the host 2 had channel paths to both clusters 32a and 32b of the storage controller 8, then to improve availability, the host 2 would want to assign the next channel to an I/O bay in one cluster that is not used by a host 2 channel. Using this general approach, the host 2 can determine the interface card 20a, b, c, d and 22a, b, c, d and port thereon to use to connect to the storage controllers 8 and 10 to select an I/O bay and cluster that avoids a single point of failure.

When adding a path from a channel to a storage controller, the host 2 will want to select an interface port within the selected storage controller that will improve availability or eliminate a current single point of failure. Preferred embodiments provide a methodology for determining the availability rating of each interface port to select an interface port, within an interface card, within an I/O bay, within a cluster of the control unit, that will increase the overall availability to the selected storage controller 8 or 10. In this way, a physical path is selected such that a failure at a cluster, I/O bay or interface card level in one of the currently used interface ports will not cause a failure to access the device on all paths.

In preferred embodiments, to determine the configuration of the storage controller 8 or 10, the host 2 will consider the node description data, also known as a node descriptor (ND), which is data currently provided by storage controller systems. Storage controller self-description data is available for each interface port 24a, b, c, d; 26a, b, c, d; 28a, b, c, d; 30a, b, c, d on the storage controllers 8 or 10. The host 2 would issue a Set Interface ID command with a Read Node Descriptor suborder chained into a Read Node Descriptor command to the storage controller 8 or 10 through a channel path that connects to one interface port 24a, b, c, d; 26a, b, c, d; 28a, b, c, d; 30a, b, c, d. Details of the node descriptor (ND) is described in IBM document "Enterprise Systems Architecture/390: Common I/O-Device Commands", IBM document no. SA22-7204-01 (Copyright IBM, 1992) and U.S. Pat. No 5,197,069, assigned to IBM, which publications and patent are incorporated herein by reference in their entirety.

Figure 2:
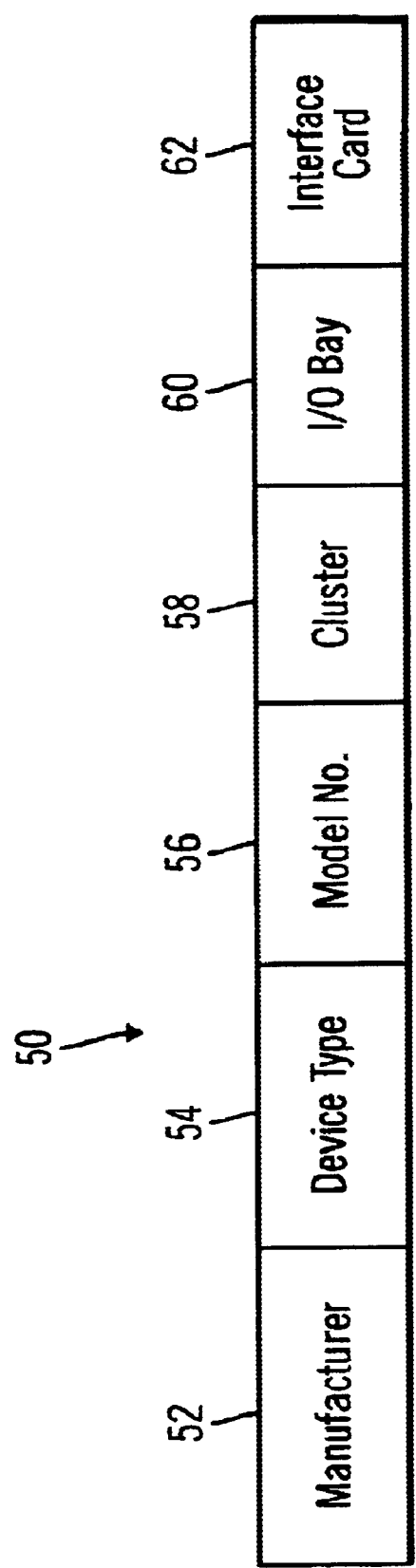
FIG. 2 illustrates fields of data included in a node descriptor that are used with the preferred embodiments of the present invention to determine the availability of a proposed interface to the control unit.

The node descriptor (ND) returned by the storage controller 8 or 10 to the host 2 provides specific information for the interface port through which the host 2 submitted the read command. The node descriptor (ND) includes fields providing the manufacturer, device type, and model number of the storage controller. The node descriptor further includes a two byte tag, at bytes 30 and 31, that provides information on the cluster, I/O bay, and interface card for the interface to the storage controller on which the read configuration data command was transmitted. FIG. 2 illustrates the fields included in the node descriptor utilized with the preferred embodiments of the present invention. Storage controllers from other manufacturers, such as Storage Technology Corporation (StorageTek) and the EMC Corporation, also provide this information in the node descriptor (ND), which the host 2 may obtain for any connection from a channel path through a physical path to the storage controller.

In preferred embodiments, the host 2 maintains in memory a control unit model table 100, shown in FIG. 3, that provides a cluster 102, I/O bay 104, and interface card 106 masks for different types of storage controllers, identified by manufacturer, device type, and model number. The masks are used to extract the bits from the node descriptor (ND) two byte tag for a particular type of storage controller to determine the cluster, I/O bay, and interface card of the node from which the node description data was read. If only one bit is provided in the mask, then only one bit is used to indicate the cluster, I/O bay and/or interface card, indicating that there are only two of the particular components. If two bits are provided in a mask, then there are four possible values for the cluster, I/O bay and/or interface card, etc. Further, the control unit model table 100 may provide information on all or numerous available storage controllers according to manufacturer 108, device type 110, and model number 112. If the table 100 does not indicate a particular model number, then the entry in the table is the default value for the manufacturer and model, e.g., entry 124, would provide the masks 102, 104, and 106 for a storage controller of the particular manufacturer and of the device type when model number information is not otherwise found in the table. Likewise, if the device type and model number were not found in the table 100, the table provides masks 102, 104, 106 in entry 128 for a storage controller of the particular manufacturer, e.g., IBM, when there is no device type and model data. Similarly, the table 100 would include a default entry of masks 102, 104, 106 when no matching manufacturer data is provided, as in entry 130.

In this way, the host 2 can use the table 100 to extract information from the node descriptor, which is currently provided in storage controller devices, on the location of the particular interface port 24a, b, c, d; 26a, b, c, d; 28a, b, c, d; 30a, b, c, d through which the host 2 is accessing the storage controller 8 or 10. In preferred embodiments, the masks are ordered from most significant point of failure to least, from left to right, e.g., cluster to I/O bay to interface card. It is possible that the storage controller will not provide a bit mask for any particular component, i.e., the mask bits for the I/O bay 104 and interface card 106 may be zero. Further, if the storage controller did not include an I/O bay, then the table would not include a mask field for an I/O bay. The two byte mask may be AND-ed against the tag in the node descriptor (ND) to extract information on the cluster, I/O bay and/or interface card of the interface port.

Figure 4A:
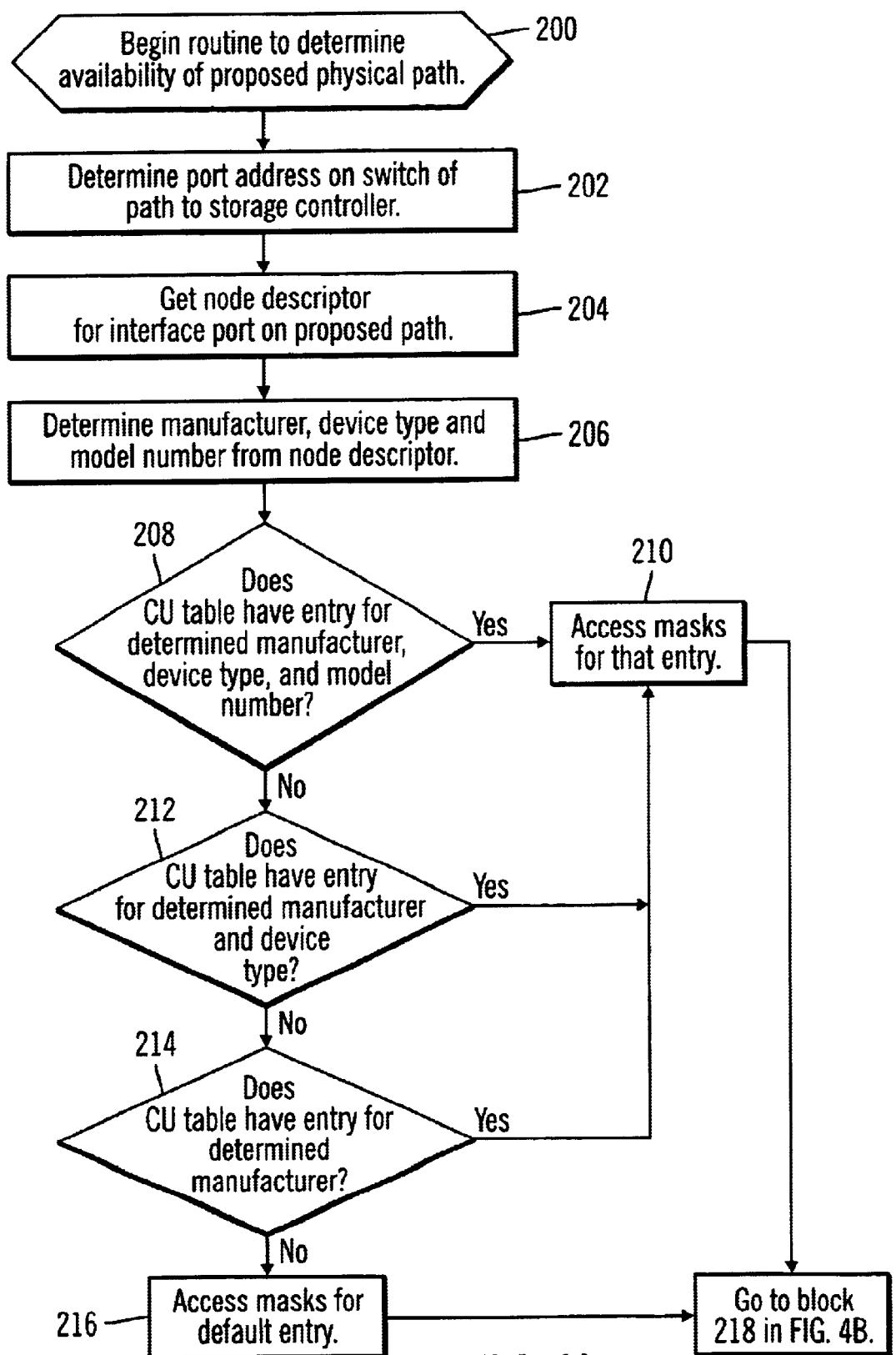
FIGS. 4a and 4b illustrate logic to determine an availability of a proposed interface to a control unit in accordance with preferred embodiments of the present invention.

FIGS. 4a, b illustrate logic implemented in the host 2 to determine an availability index of a proposed interface port connection to the storage controller 8 or 10 when determining a physical path to use for a new channel 18a, b, c, d. The host 2 would execute the logic in FIGS. 4a, b for each possible interface port at the storage controller 8 or 10, that is being considered to connect with a new channel, to determine an availability index of each potential interface port that could be associated with the new channel. This availability index may then be used when selecting a physical path to the storage controller in conjunction with availability information at different levels. Control begins at block 200 with the host 2 initiating the routine to determine the availability for a proposed interface port. The host 2 determines (at block 202) the port address of a port on the switch 4 or 6 that has a connection line to a proposed interface port 24a, b, c, d; 26a, b, c, d or 28a, b, c, d; 30a, b, c, d in the storage controller 8 or 10, respectively, being considered. Identification of the port address on the switch 4 or 6 thus specifies one proposed interface port because a connection line is provided from the switch 4 or 6 port address to the interface port. The host 2 then obtains (at block 204) the node descriptor (ND) for the proposed interface port by issuing a request for a Set Interface ID command chained to a read node identifier to the proposed interface port. From fields in the obtained node descriptor data, the host 2 can determine (at block 206) the manufacturer, device type and model number of the storage controller 8 or 10.

If the control unit table 100 has an entry for the determined manufacturer, device type, and model number (at block 208), then the host 2 accesses (at block 210) the cluster 102, I/O bay 104, and interface card 106 masks for that entry. Otherwise, if the control unit table 100 does not have an entry for the determined manufacturer, device type, and model number, then the host 2 determines (at block 212) whether the control unit table 100 has an entry for the determined manufacturer and device type. If so, the host 2 accesses (at block 210) the masks 102, 104, and 106 for that entry. Otherwise, if the control unit table does not have an entry for the determined manufacturer and device type, then the host 2 determines (at block 214) whether the control unit table 100 has an entry for the determined manufacturer. If so, then the host 2 accesses (at block 210) the masks 102, 104, and 106 for that entry. If there is no entry for the determined manufacturer, device type and model number, then the host 2 accesses (at block 216) the masks 102, 104, 106 for the default entry 130.

Figure 4B:
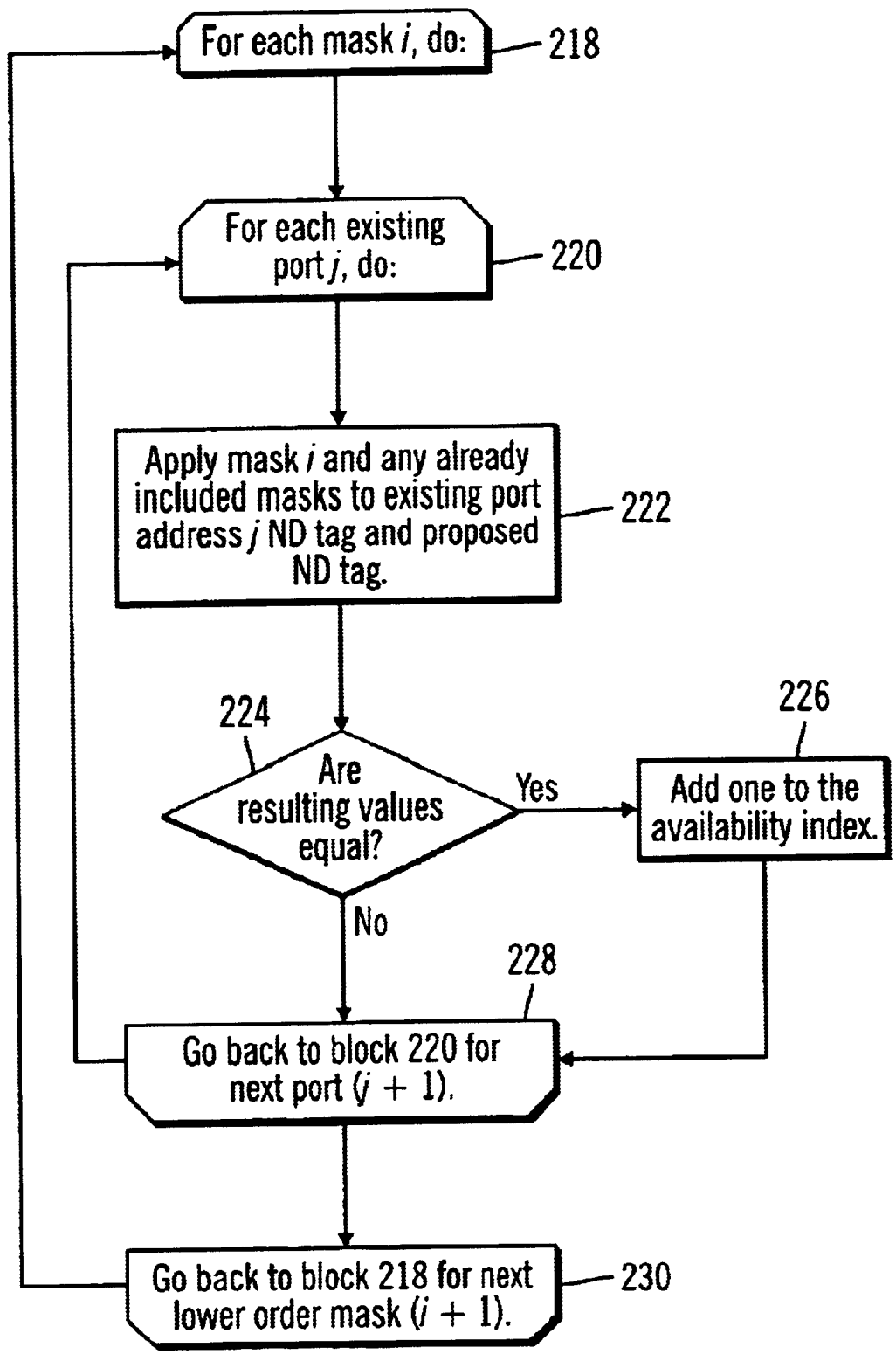

After accessing the cluster 102, I/O bay 104, and interface card 106 masks, the storage controller proceeds to block 218 in FIG. 4b to perform the availability index calculations. To calculate the availability index for the proposed interface port connected to the determined switch port address, the host 2 executes two loops. An outer loop from blocks 218 to 230 performs blocks 220–228 for each mask accessed from the entry, starting from the highest order mask to the lowest order mask (e.g., cluster mask to I/O bay mask to interface card mask, etc.). For each mask, an inner loop from blocks 220–228 performs blocks 220–226 for each existing interface port to which a channel 118a, b, c, d is assigned. At block 222, the host 2 applies mask i to the tag bytes in the node descriptor (ND) for the interface port connected to the switch 4 or 6 port address j, to which a path is already assigned, and the accessed tag bytes of the proposed interface port. The host 2 would maintain the NDs of existing interface ports, which were previously accessed when assigning a channel 18a, b, c, d to the physical path. If there are any higher order masks, then those are also applied. Thus, for mask 1, which is the highest order cluster mask, only that mask would be applied.

In this way, points of failure are determined at a failure level, which includes the values of previous, higher order levels of failure. As discussed, a higher order level of failure is a failure that would also cause the failure of a lower order level, whereas a failure at a lower order level will not completely cause the higher level component to fail as there are other paths to the higher level. If the two values obtained from applying the mask(s) are equal (at block 224), then a one is added (at block 226) to the availability index for the proposed interface port 24a, b, c, d; 26a, b, c, d; 28a, b, c, d; 30a, b, c, d to lower the actual availability. Thus, in this example implementation, a higher availability index indicates that a proposed interface port would have more points of failure in common with the currently used interface ports than proposed interface ports with a lower availability index rating. Otherwise, if the values are not equal, then nothing is added to the availability index, and the next proposed interface port 24a, b, c, d; 26a, b, c, d or 28a, b, c, d; 30a, b, c, d is considered. In this way, the availability index is increased for each currently used interface port that has the same point of failure at different levels, e.g., cluster, I/O bay, and interface card. The more single points of failure a proposed port 24a, b, c, d; 26a, b, c, d or 28a, b, c, d; 30a, b, c, d has in common with currently used interface ports, the less desirable the proposed interface port because such proposed interface port does not improve the availability of the overall system. The lower the availability index, the less likely the proposed interface port is to be affected by a failure in one of the levels, i.e., cluster, I/O bay, interface card, for an existing interface port.

The host 2 may then utilize this availability index for each proposed interface port when determining the interface port 24a, b, c, d; 26a, b, c, d or 28a, b, c, d; 30a, b, c, d to use in the new physical path for a new channel 18a, b, c, d.

Preferred embodiments provide a technique for determining the availability of a proposed interface port by using information, i.e., the tag bytes, and manufacturer, device type, and model number fields in the ND that are already available in storage controllers produced by many of the largest storage controller manufacturers, such as IBM, StorageTek, and EMC. This current information is exploited by providing a new control unit table that includes masks that can be used to extract the ND information for different interface ports to the storage controller including, the cluster and I/O bay for the proposed interface port. In preferred embodiments, the host 2 may maintain such control unit tables 100 that may be updated from time to time. Alternatively, the masks to use for a storage controller may be provided directly from the storage controller 8, 10 in response to a request from the host 12, thereby avoiding the need to use the control unit table 100. The commonly assigned and copending patent application Ser. No. 09/671, 416 entitled "System, Method, And Program For Determining The Availability of Interfaces to a Device from Information Provided by the Device", incorporated by reference above, describes how the host 12 may obtain the mask directly from the storage controller 8, 10.

CONCLUSION

This concludes the description of the preferred embodiments of the invention. The following describes some alternative embodiments for accomplishing the present invention.

The preferred embodiments may be implemented as a method, system or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

Preferred embodiments can be applied whenever a determination is made of an availability index when connecting an adaptor to one of multiple available interface ports and can apply to connections between any two devices and is thereby not limited to selecting a port to connect a host to a storage controller. Further, the preferred embodiments could apply when determining a network connection, e.g., TCP/IP, etc., when selecting paths to use to connect with a remote device or computer over a network or Fibre Channel fabrics (or Storage Area Networks (SANS)).

Preferred embodiments were described with respect to three masks for considering three different failure and repair unit boundaries in the storage controller, including cluster, I/O bay, and interface card when determining availability. However, in alternative embodiments additional or fewer masks may be provided depending on the number of failure and repair unit boundaries being considered in the storage controller for the proposed path. In further embodiments, additional control unit and repair boundaries may be considered.

Preferred embodiments were described as implemented with large scale storage controllers, such as the IBM Enterprise Storage Server and 3990 storage controllers, and other similar class storage controllers that use similar node descriptor elements to provide information on a particular interface port at the storage controller. However, the preferred embodiments may apply to any control unit, storage controller, server or controller system that controls access to storage and that provides information on internal failure and repair boundaries that may be accessed and used to determine availability. Moreover, the preferred embodiments may apply to determine the availability to any type of addressable device, not just control units.

The host 2 may be any central electronic complex (CEC) system known in the art including multiple CPUs executing simultaneous operations. The CEC may include one or more operating systems. Thus, one CEC host can appear to operate as several host systems. Alternatively, the host 2 can be any server or computer known in the art.

Preferred embodiments were described with respect to a host system that communicates with a channel subsystem, which in turn communicates via channels to control units, which access the I/O devices. In alternative embodiments, the data paths may extend from the channel subsystem directly to the I/O device or, alternatively, from the host system directly to the I/O device without the intervention of the channel subsystem and subchannel constructs, control units and/or switches.

In summary, preferred embodiments disclose a system, method, and program for for analyzing proposed interface ports to a device. For each proposed interface port, a determination is made of a number of single points of failure for the proposed interface port in common with interface ports currently used to access the device. For each proposed interface port, a determination is made of a relative availability rating based on the number of single points of failure for each proposed interface port.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for analyzing proposed interface ports to a device, comprising:

for each proposed interface port, determining a number of single points of failure for the proposed interface port in common with interface ports currently used to access the device, wherein determining the number of single points of failure further comprises reading failure boundary data from the device indicating at least one failure boundary of a proposed interface to the device;

for each proposed interface port, determining a relative availability rating based on the number of single points of failure for each proposed interface port, wherein determining the relative availability rating based on the single points of failure comprises comparing the failure boundary of the proposed interface with failure boundary data indicating at least one failure boundary of existing interfaces to the device; and applying at least one mask to the failure boundary data for the proposed interface and existing interfaces to determine at least one failure boundary for the proposed interface and existing interfaces, wherein the determined at least one failure boundary for the proposed and existing interfaces is compared to determine the relative availability rating.

2. The method of claim 1, further comprising requesting one mask from the device to apply to the failure boundary data for the proposed and existing interfaces.

3. The method of claim 3, further comprising:

accessing product information for the device; and comparing the product information with fields in a table to determine a matching entry in the table, wherein the each entry in the table provides the at least one mask to apply to the failure boundary data to determine the at least one failure boundary of the existing and proposed interfaces.

4. The method of claim 3, wherein the device is a storage controller and wherein the product information and the failure boundary data is maintained in a node descriptor element for one interface to the storage controlled.

5. The method of claim 4, wherein the product information table may be updated by information received from the storage controller.

6. The method of claim 3, wherein the product information includes manufacturer, device type, and model number components, and wherein the entry in the table that matches the most of the manufacturer, device type, and model number components is the determined matching entry.

7. The method of claim 6, wherein determining the relative availability rating comprises increasing the relative availability rating whenever a cluster value for the proposed interface and one existing interface match and whenever both the cluster value and interface values for the proposed interface and one existing interface match, wherein, a higher relative availability rating indicates that the proposed interface avoids fewer single points of failure than other proposed interfaces.

8. A method for analyzing proposed interface ports to a device, comprising:

for each proposed interface port, determining a number of single points of failure for the proposed interface port in common with interface ports currently used to access the device, wherein determining the number of single points of failure further comprises reading failure boundary data from the device indicating at least one failure boundary of a proposed interface to the device; and for each proposed interface port, determining a relative availability rating based on the number of single points of failure for each proposed interface port, wherein determining the relative availability rating based on the single points of failure comprises comparing the failure boundary of the proposed interface with failure boundary data indicating at least one failure boundary of existing interfaces to the device, and wherein failure boundaries include a cluster and an interface in a control unit.

9. The method of claim 8, wherein the failure boundaries further include an I/O bay, wherein determining the relative availability rating comprises increasing the relative availability rating whenever the cluster value for the proposed interface and one existing interface match, whenever both of the cluster value and I/O bay value for the proposed interface and one existing interface match, and whenever all of the cluster value, I/O bay value, and interface values for the proposed interface and one existing interface match, wherein a higher relative availability rating indicates that the proposed interface has more single points of failure than other proposed interfaces.

10. A method for analyzing proposed interface ports to a device, comprising:

for each proposed interface port, determining a number of single points of failure for the proposed interface port in common with interface ports currently used to access the device, wherein determining the number of single points of failure further comprises reading failure boundary data from the device indicating at cast one failure boundary of a proposed interface to the device, wherein there are a plurality of failure boundaries in the device, wherein a failure of a higher order failure boundary for one interface would cause the failure of all lower order failure boundaries for the interface, and wherein the failure of a lower order failure boundary for one interface would not cause the failure of all higher order failure boundaries in the interface; and for each proposed interface port, determining a relative availability rating based on the number of single points of failure for each proposed interface port, wherein determining the relative availability rating based on the single points of failure comprises comparing the failure boundary of the proposed interface with failure boundary data indicating at least one failure boundary of existing interfaces to the device, and wherein determining the relative availability rating comprises increasing the relative availability rating for each failure boundary whenever a failure boundary value for the proposed interface and one existing interface match, wherein a higher relative availability rating indicates that the proposed interface avoids fewer points of failure than other proposed interfaces.

11. A system for analyzing proposed interface ports to a device, comprising:

means for determining, for each proposed interface port, a number of single points of failure for the proposed interface port in common with interface ports currently used to access the device, wherein the means for determining the number of single points of failure further comprises reading failure boundary data from the device indicating at least one failure boundary of a proposed interface to the device;

means for determining, for each proposed interface port, a relative availability rating based on the number of single points of failure for each proposed interface port, wherein the means for determining the relative availability rating based on the single points of failure comprises comparing the failure boundary of the proposed interface with failure boundary data indicating at least one failure boundary of existing interfaces to the device; and means for applying at least one mask to the failure boundary data for the proposed interface and existing interfaces to determine at least one failure boundary for the proposed interface and existing interfaces, wherein the determined at least one failure boundary for the proposed and existing interfaces is compared to determine the relative availability rating.

12. The system of claim 11, further comprising means for requesting one mask from the device to apply to the failure boundary data for the proposed and existing interfaces.

13. The system of claim 11, further comprising:

means for accessing product information for the device; and means for comparing the product information with fields in a table to determine a matching entry in the table, wherein the each entry in the table provides the at least one mask to apply to the failure boundary data to determine the at least one failure boundary of the existing and proposed interfaces.

14. The system of claim 13, wherein the device is a storage controller and wherein the product information and the failure boundary data is maintained in a node descriptor element for one interface to the storage controller.

15. The system of claim 14, wherein the product information table may be updated by information received from the storage controller.

16. The system of claim 13, wherein the product information includes manufacturer, device type, and model number components, and wherein the entry in the table that matches the most of the manufacturer, device type, and model number components is the determined matching entry.

17. The system of claim 16, wherein determining the relative availability rating comprises increasing the relative availability rating whenever a cluster value for the proposed interface and one existing interface match and whenever both the cluster value and interface values for the proposed interface and one existing interface match, wherein a higher relative availability rating indicates that the proposed interface avoids fever single points of failure than other proposed interfaces.

18. A system for analyzing proposed interface ports to a device, comprising:

means for determining, for each proposed interface port, a number of single points of failure for the proposed interface port in common with interface ports currently used to access the device, wherein the means for determining the number of single points of failure further comprises reading failure boundary data from the device indicating at least one failure boundary of a proposed interface to the device;

means for determining, for each proposed interface port, a relative availability rating based on the number of single points of failure for each proposed interface port, wherein the means for determining the relative availability rating based on the single points of failure comprises comparing the failure boundary of the proposed interface with failure boundary data indicating at least one failure boundary of existing interfaces to the device, wherein failure boundaries include a cluster and an interface in a control unit.

19. The system of claim 18, wherein the failure boundaries further include an I/O bay, wherein determining the relative availability rating comprises increasing the relative availability rating whenever the cluster value for the proposed interface and one existing interface match, whenever both of the cluster value and I/O bay value for the proposed interface and one existing interface match, and whenever all of the cluster value, I/O bay value, and interface values for the proposed interface and one existing interface match, wherein a higher relative availability rating indicates that the proposed interface has more single points of failure than other proposed interfaces.

20. A system for analyzing proposed interface ports to a device, comprising:

means for determining, for each proposed interface port, a number of single points of failure for the proposed interface port in common with interface ports currently used to access the device, wherein the means for determining the number of single points of failure further comprises reading failure boundary data from the device indicating at least one failure boundary of a proposed interface to the device, wherein there are a plurality of failure boundaries in the device, wherein a failure of a higher order failure boundary for one interface would cause the failure of all lower order failure boundaries for the interface, and wherein the failure of a lower order failure boundary for one interface would not cause the failure of all higher order failure boundaries in the interface;

means for determining, for each proposed interface port, a relative availability rating based on the number of single points of failure for each proposed interface port, wherein the means for determining the relative availability rating based on the single points of failure comprises comparing the failure boundary of the proposed interface with failure boundary data indicating at least one failure boundary of existing interfaces to the device, and wherein determining the relative availability rating comprises increasing the relative availability rating for each failure boundary whenever a failure boundary value for the proposed interface and one existing interface match, wherein a higher relative availability rating indicates that the proposed interface avoids fewer points of failure than other proposed interfaces.

21. An information bearing medium for analyzing proposed interface ports to a device, wherein the information bearing medium includes code capable of causing a processor to perform:

for each proposed interface port, determining a number of single points of failure for the proposed interface port in common with interface ports currently used to access the device, wherein determining the number of single points of failure further comprises reading failure boundary data from the device indicating at least one failure boundary of a proposed interface to the device;

for each proposed interface port, determining a relative availability rating based on the number of single points of failure for each proposed interface port, and wherein determining the relative availability rating based on the single points of failure comprises comparing the failure boundary of the proposed interface with failure boundary data indicating at least one failure boundary of existing interfaces to the device; and applying at least one mask to the failure boundary data for the proposed interface and existing interfaces to determine at least one failure boundary for the proposed interface and existing interfaces, wherein the determined at least one failure boundary for the proposed and existing interfaces is compared to determine the relative availability rating.

22. The information bearing medium of claim 21, further comprising requesting one mask from the device to apply to the failure boundary data for the proposed and existing interfaces.

23. The information bearing medium of claim 21, further comprising:

accessing product information for the device; and comparing the product information with fields in a table to determine a matching entry in the table, wherein the each entry in the table provides the at least one mask to apply to the failure boundary data to determine the at least one failure boundary of the existing and proposed interfaces.

24. The information bearing medium of claim 23, wherein the device is a storage controller and wherein the product information and the failure boundary data is maintained in a node descriptor element for one interface to the storage controller.

25. The information bearing medium of claim 24, wherein the product information table may be updated by information received from the storage controller.

26. The information bearing medium of claim 23, wherein the product information includes manufacturer, device type, and model number components, and wherein the entry in the table that matches the most of the manufacturer, device type, and model number components is the determined matching entry.

27. The information bearing medium of claim 26, wherein determining the relative availability rating comprises increasing the relative availability rating whenever a cluster value for the proposed interface and one existing interface match and whenever both the cluster value and interface values for the proposed interface and one existing interface match, wherein a higher relative availability rating indicates that the proposed interface avoids fewer single points of failure than other proposed interfaces.

28. An information bearing medium for analyzing proposed interface ports to a device, wherein the information bearing medium includes code capable of causing a processor to perform:

for each proposed interface port, determining a number of single points of failure for the proposed interface port in common with interface ports currently used to access the device, wherein determining the number of single points of failure further comprises reading failure boundary data from the device indicating at least one failure boundary of a proposed interface to the device;

for each proposed interface port, determining a relative availability rating based on the number of single points of failure for each proposed interface port, and wherein determining the relative availability rating based on the single points of failure comprises comparing the failure boundary of the proposed interface with failure boundary data indicating at least one failure boundary of existing interfaces to the device, and wherein failure boundaries include a cluster and an interface in a control unit.

29. The information bearing medium of claim 28, wherein the failure boundaries further include an I/O bay, wherein determining the relative availability rating comprises increasing the relative availability rating whenever the cluster value for the proposed interface and one existing interface match, whenever both of the cluster value and I/O bay value for the proposed interface and one existing interface match, and whenever all of the cluster value, I/O bay value, and interface values for the proposed interface and one existing interface match, wherein a higher relative availability rating indicates that the proposed interface has more single points of failure than other proposed interfaces.

30. An information bearing medium for analyzing proposed interface ports to a device, wherein the information bearing medium includes code capable of causing a processor to perform:

for each proposed interface port, determining a number of single points of failure for the proposed interface port in common with interface ports currently used to access the device, wherein determining the number of single points of failure further comprises reading failure boundary data from the device indicating at least one failure boundary of a proposed interface to the device, wherein there are a plurality of failure boundaries in the device, wherein a failure of a higher order failure boundary for one interface would cause the failure of all lower order failure boundaries for the interface, and wherein the failure of a lower order failure boundary for one interface would not cause the failure of all higher order failure boundaries in the interface;

for each proposed interface port, determining a relative availability rating based on the number of single points of failure for each proposed interface port, and wherein determining the relative availability rating based on the single points of failure comprises comparing the failure boundary of the proposed interface with failure boundary data indicating at least one failure boundary of existing interfaces to the device; and wherein determining the relative availability rating comprises increasing the relative availability rating for each failure boundary whenever a failure boundary value for the proposed interface and one existing interface match, wherein a higher relative availability rating indicates that the proposed interface avoids fewer points of failure than other proposed interfaces.

* * * * *

UNITED STATES PATENT AND TRADEMARK OFFICE
CERTIFICATE OF CORRECTION

PATENT NO. : 6,748,557 B1
DATED : June 8, 2004
INVENTOR(S) : Brent Cameron Beardsley, William J. Rooney and Harry Morris Yudenfriend It is certified that error appears in the above-identified patent and that said Letters Patent is hereby corrected as shown below:

Column 10,
Line 29, delete "claim 3" and insert -- claim 1 --.
Line 40, delete "controlled" and insert -- controller --.

Signed and Sealed this

Twenty-fifth Day of April, 2006

JON W. DUDAS
*Director of the United States Patent and Trademark Office*